US006985958B2

(12) United States Patent
Lucovsky et al.

(10) Patent No.: US 6,985,958 B2
(45) Date of Patent: Jan. 10, 2006

(54) MESSAGING INFRASTRUCTURE FOR IDENTITY-CENTRIC DATA ACCESS

(75) Inventors: Mark Lucovsky, Sammamish, WA (US); Shaun D. Pierce, Sammamish, WA (US); Alexander T. Weinert, Seattle, WA (US); Michael G. Burner, Redmond, WA (US); Richard B. Ward, Redmond, WA (US); Paul J. Leach, Seattle, WA (US); George M. Moore, Issaquah, WA (US); Arthur Zwiegincew, Bothell, WA (US); Vivek Gundotra, Tustin, CA (US); Robert M. Hyman, Sammamish, WA (US); Jonathan D. Pincus, Bellevue, WA (US); Daniel R. Simon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 10/003,754

(22) Filed: Oct. 22, 2001

(65) Prior Publication Data

US 2002/0174125 A1 Nov. 21, 2002

Related U.S. Application Data

(60) Provisional application No. 60/275,809, filed on Mar. 14, 2001.

(51) Int. Cl.
*G06F 13/00* (2006.01)

(52) U.S. Cl. ...................... 709/230; 709/246; 707/103; 707/104

(58) Field of Classification Search ................ 709/230, 709/236, 237, 245, 246; 719/313, 315, 316; 707/103, 104
See application file for complete search history.

(56) References Cited

U.S. PATENT DOCUMENTS

| | | | | |
|---|---|---|---|---|
| 5,544,302 | A * | 8/1996 | Nguyen | 715/837 |
| 5,634,129 | A * | 5/1997 | Dickinson | 719/315 |
| 5,872,926 | A | 2/1999 | Levac et al. | 395/200.36 |
| 6,092,101 | A | 7/2000 | Birrell et al. | 709/206 |
| 6,148,302 | A * | 11/2000 | Beylin et al. | 707/102 |
| 6,167,402 | A | 12/2000 | Yeager | 707/10 |
| 6,336,118 | B1 * | 1/2002 | Hammond | 707/103 Y |
| 6,336,147 | B1 * | 1/2002 | Brownell et al. | 719/310 |
| 6,553,427 | B1 * | 4/2003 | Chang et al. | 719/314 |

OTHER PUBLICATIONS

Simple Object Access Protocol (SOAP) 1.1 W3C Note May 8, 2000 Don Box, DevelopMentor; David Ehnebuske, IBM; Gopal Kakivaya, Microsoft Andrew Layman, Microsoft; Noah Mendelsohn, Lotus Development Corp.; Henrik Frystyk Nielsen, Microsoft Satish Thatte, Microsoft; Dave Winer, UserLand Software, Inc. pp. 1-35.

* cited by examiner

*Primary Examiner*—Viet D. Vu
(74) *Attorney, Agent, or Firm*—Workman Nydegger

(57) ABSTRACT

A messaging data structure for accessing data in an identity-centric manner. An identity may be a user, a group of users, or an organization. Instead of data being maintained on an application-by-application basis, the data associated with a particular identity is stored by one or more data services accessible by many applications. The data is stored in accordance with a schema that is recognized by a number of different applications and the data service. The messaging data structure includes fields that identify the target data object to be operated upon using an identity field, a schema field, and an instance identifier field. In addition, the desired operation is specified. Thus, the target data object is operated on in an identity-centric manner.

88 Claims, 9 Drawing Sheets

MESSAGING INFRASTRUCTURE FOR IDENTITY-CENTRIC DATA ACCESS

CROSS-REFERENCE TO RELATED APPLICATION

The present application claims priority from co-pending U.S. provisional application Ser. No. 60/275,809, filed Mar. 14, 2001 and entitled "Identity-Based Service Communication Using XML Messaging Interfaces", which provisional application is incorporated herein by reference in its entirety.

BACKGROUND OF THE INVENTION

1. The Field of the Invention

The present invention relates to the field of data access technologies. Specifically, the present invention relates to messaging data structures that facilitate access to data in a user or identity-centric manner rather than in an application-centric manner.

2. Background and Related Art

The Internet has revolutionized the way people access information. With the aid of a conventional Internet-enabled computing device, one may obtain information on almost any subject with relatively little effort. Information is so abundant, that our ability to manage such information is often overwhelmed.

However, information is often irrelevant to all but a few. Some information is specific to only a single identity such as a person, group of people or organization. Such information may include, for example, addresses, telephone numbers, contacts, task lists, journals, schedules, grocery lists, music favorites and other preferences.

In order to manage such identity-specific information, a data access model 100 was developed as illustrated in FIG. 1. The data access model 100 include three fundamental components; an identity 110, an application 120, and data 130. The application 120 manages data 130 that the application 120 needs to operate properly. The data 130 typically includes identity-specific data as well as other types of data. During operation, the application 120 typically performs various operations on the data 130 either on its own initiative, or in response to instructions issued by the identity 110 or another program module.

The bi-directional arrow 140 represents a strong logical coupling between the application 120 and the data 130. Although the data 130 may include identity-specific data, the data 130 may be accessed only through the application that manages the data. For example, a Web-based grocery service application may manage a grocery list for an individual, store a residence address for delivery of the groceries, and store credit card information for automatic payment. All of this data is identity-specific. However, the data is accessed only through the Web-based grocery service application. Likewise, a calendar application may maintain schedule information for a given identity. This calendar data is accessed via the calendar application only.

FIG. 2 illustrates this principles by extending the model of FIG. 1 to include multiple application programs, each interacting with their own data. For example, in addition to using application 120, the identity 110 also interfaces with applications 221 through 224. Each application 221 through 224 interacts with their own data 231 through 234, respectively. While there may be considerable redundancy between the data represented by data 130 and 231 through 234, each set of data is maintained and accessed via its own corresponding application.

Although functional, maintaining data on a per-application basis has disadvantages. Namely, if an application is no longer available, the corresponding data is often lost. For example, if an individual wanted to change Web-based grocery services, the individual would typically have to reenter the grocery list and the delivery address to a new Web-based application. Also, suppose a calendar application maintained schedule information in a proprietary format. In order to change from that calendar application, a user may have to reenter the calendar information for the next application.

In addition, since the application maintains the data, the user must access the data via the application. If the application is not mobile, the data is not mobile either, absent efforts to make the data redundant in multiple locations. Making the data redundant between applications often requires user effort to periodically synchronize the data. In addition, between synchronizations, the data sets in the different applications may diverge as the data changes. Sometimes, if the data diverges inconsistently in both applications, user intervention is required to resolve the inconsistencies. Accordingly, if the application is not mobile, the data is not mobile either without expending user effort.

Therefore, what is desired are data structures that allow identities more flexible access to and control over their corresponding identity-specific information regardless of the application.

SUMMARY OF THE INVENTION

Messaging data structures that facilitate more identity-centric data access are described. An identity may be a user, a group of users, an organization or any other identifiable entity. Instead of data being maintained on an application-by-application basis, the data associated with a particular identity is stored by one or more data services accessible by many applications. Each data service may store a particular type of data for a number of identities. For example, there may be a calendar data service that stores calendar information for the identity, an in-box data service that stores received e-mails for the identity, and the like.

The data is stored in accordance with a schema that is recognized by a number of different applications and the data service. When a user is to perform an operation on the identity's data, the application that the user is interfacing with generates a message that has a structure that is recognized by the data service. The message represents a request to perform an operation on the data structure corresponding to the identity. The data service receives and interprets the message, and then determines whether or not to honor the request. For example, the data service may consult corresponding access control rules to determine if the application or user is authorized to perform the operation. An example of access control rules is an Access Control List or ACL, which is used in this description as an example of access control rules. If authorized, the data service then performs the operation. The operation may include, for example deleting, updating, adding, or querying the data object.

The message data structure includes various fields that are organized according to a message schema. The fields identify the data object by identifying the identity that owns the data object, identifying the schema of the data object, and if necessary, identifying the instance of the data object. In addition, the message data structure identifies the desired operation to be performed on the target data object. A service address identifies the location of the service that is to perform the requested operation on the identity's data object. In addition, correlation information is included so that a response to the request may be recognized. By generating and interpreting such messages using a message schema, the data object may be maintained on an identity-centric manner, rather than having each application maintain its own version of the identity's data.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
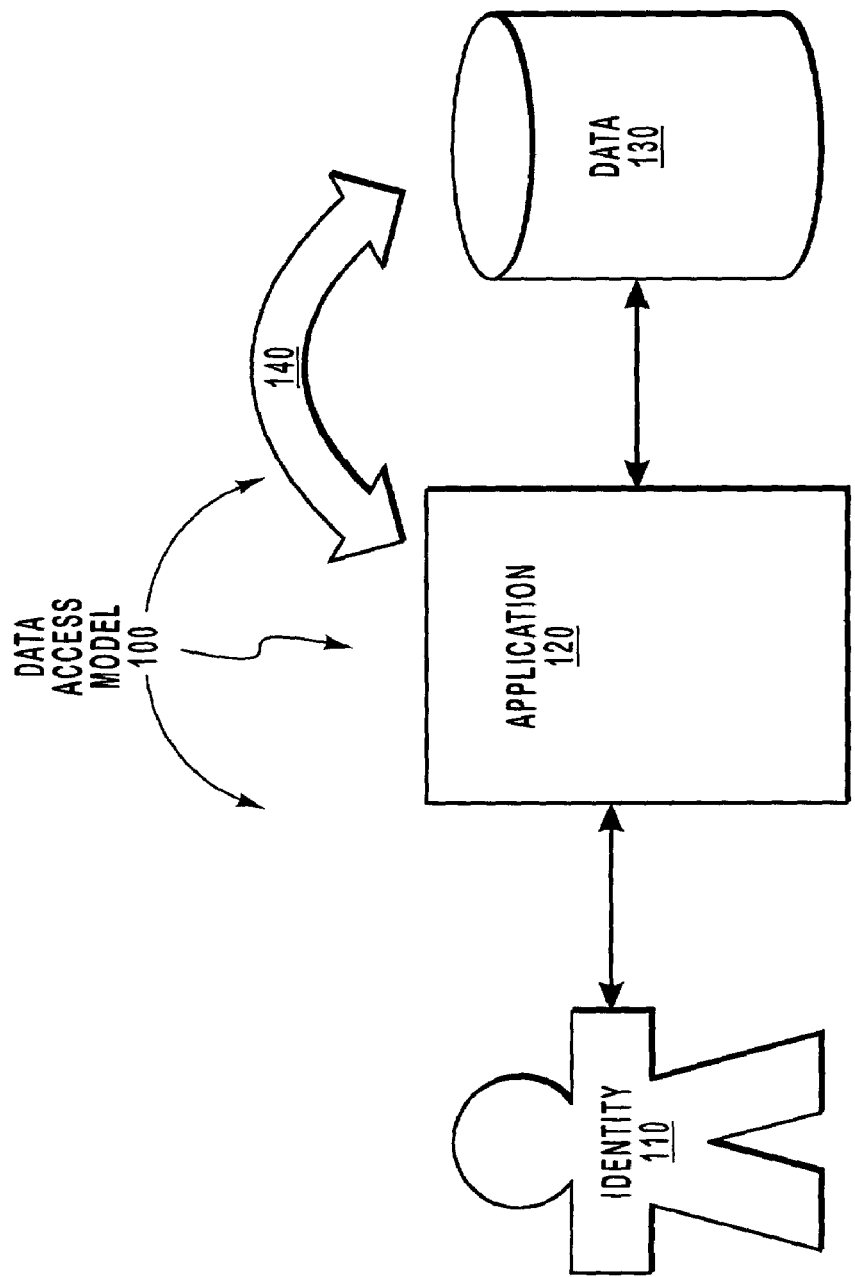
FIG. 1 schematically illustrates a model that depicts the conventional relationship between an identity, an application, and data in accordance with the prior art in which there is a strong coupling between the application and the data.

The present invention extends to an identity-based messaging data structure for requesting an operation be performed on identity-specific data independent of the application accessing the data. Throughout this description and in the claims, an identity is defined as being a person, a group of people, an organization, or any other identifiable entity. Such identifiable entities may include, for example, a science project, a fundraising event, a word processing document, a power point presentation, a conference room, or an x-ray machine. However, this list is illustrative only, and not exhaustive. The messaging data structure described herein may be implemented in a network environment in which data is managed based on the identity that owns the data, rather than based on the application that accesses the data.

Each identity may be associated with a variety of data objects that are owned by the identity. Each data object associated with an identity may be specific to a particular data type. For example, an identity may have an associated data object that represents calendar data, personal information data, grocery list data, contacts data, task data, documents data or the like. Each of these data objects may be organized according to a data format (also called herein a "schema") that is suited to the particular data type of the data object.

The messaging data structure uniquely identifies the desired identity-specific data by specifying the data type or schema of the desired data object and by specifying the associated identity. In order to properly route the data structure to the service that manages the data object, the data structure also includes the network address of the service. The messaging data structure includes information identifying the specific operation to be performed on the data object. In addition, the messaging data structure includes correlation information to match any potential response to the request. In some instances, further information may be included in the messaging data structure as described in further detail below.

The embodiments of the present invention may comprise a special purpose or general purpose computing device including various computer hardware, as discussed in greater detail below. Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. The claims may mention the term "computer program product." In this description and in the claims, this term does not imply that the computer program product was bought for a price. The term "computer program products" also refers to free products.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. In this description and in the claims, a "network" is defined as any medium over which messages may be communicated. Thus, a network may include a medium for messaging between two different machines. However, a network may also be a mechanism for communicating messages between two processes running on the same machine.

Although not required, the invention will be described in the general context of computer-executable instructions, such as program modules, being executed by computing devices. Generally, program modules include routines, programs, objects, components, data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 2:
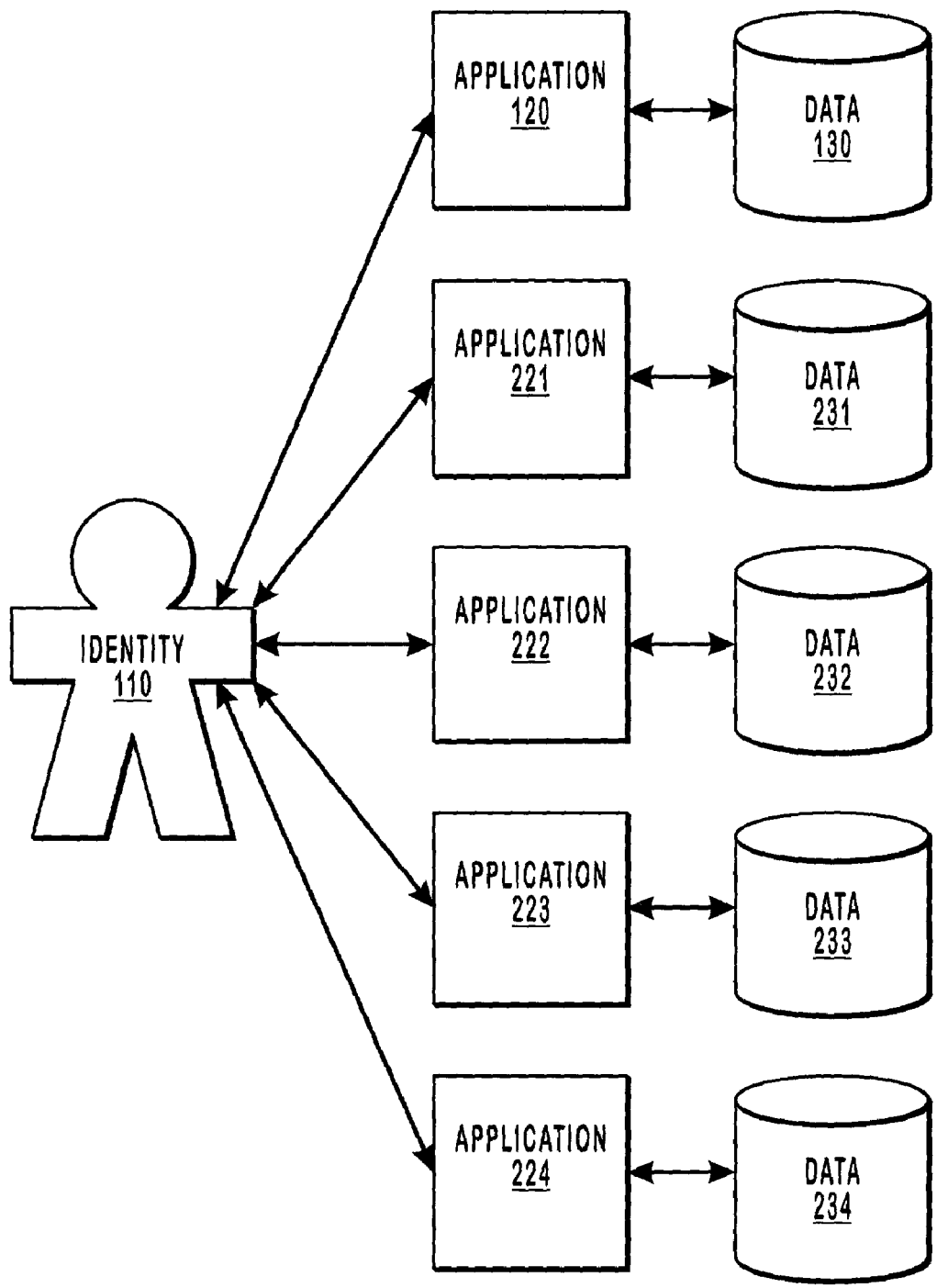
FIG. 2 schematically illustrates the conventional model of FIG. 1 in which multiple applications interact with corresponding data on an application-by-application basis.
Figure 3:
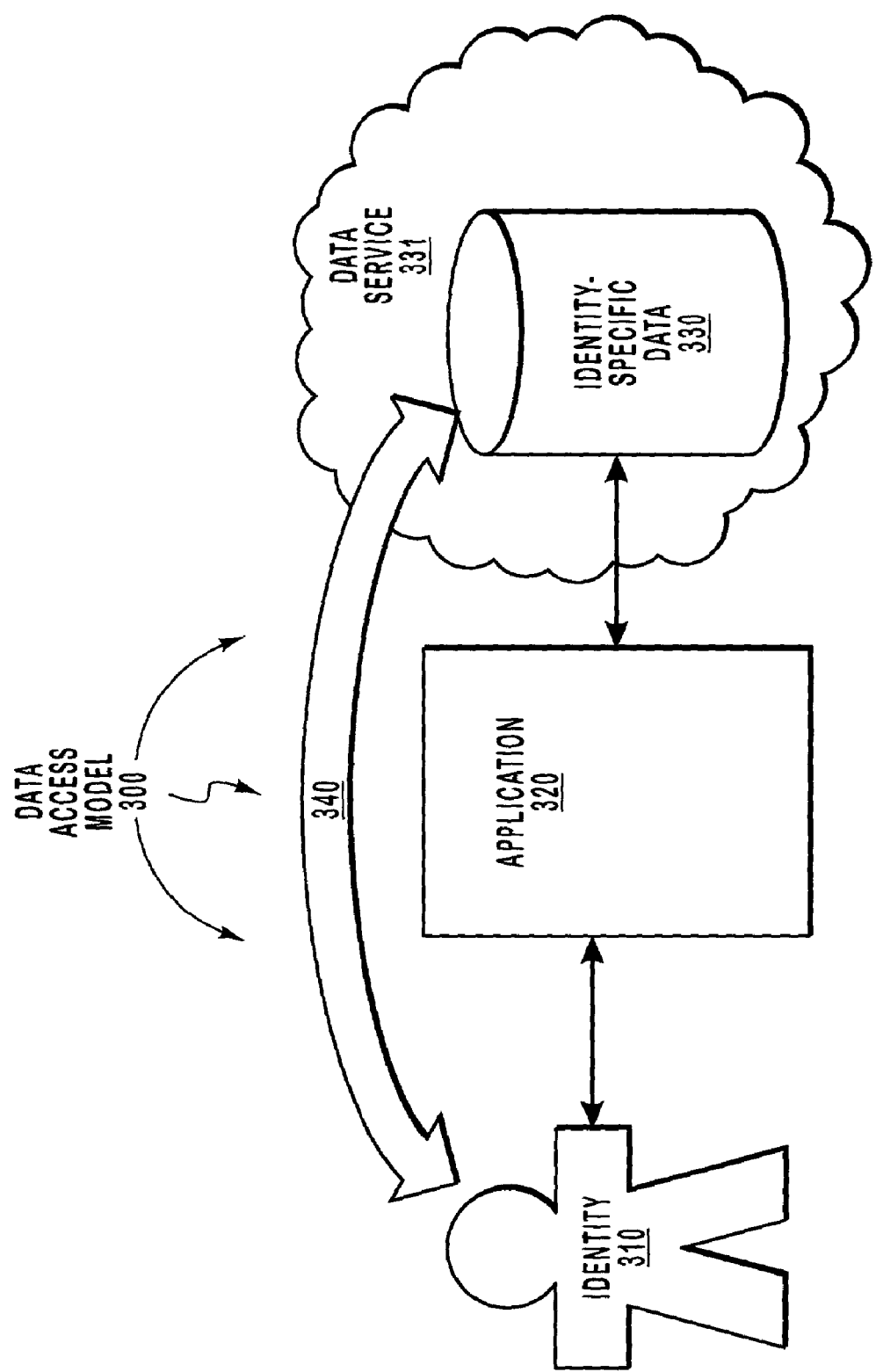
FIG. 3 schematically illustrates a model depicting the relationship between a user, an application, and data in accordance with the present invention in which there is a strong coupling between the identity and the data.

In contrast to the application-centric model for data access illustrated in FIGS. 1 and 2, the principles of the present invention allow an identity to have control over its identity-specific data independent of the application used to access the data. FIG. 3 schematically illustrates a model 300 for accessing data in accordance with the present invention. FIG. 3 may be contrasted with FIG. 1. The model includes an identity 310, an application 320, and a data service 331 that maintains identity-specific data 330. In contrast to arrow 140 of FIG. 1, an arrow 340 of FIG. 3 represents a strong coupling between the identity 310 and the identity-specific data 330.

Figure 4:
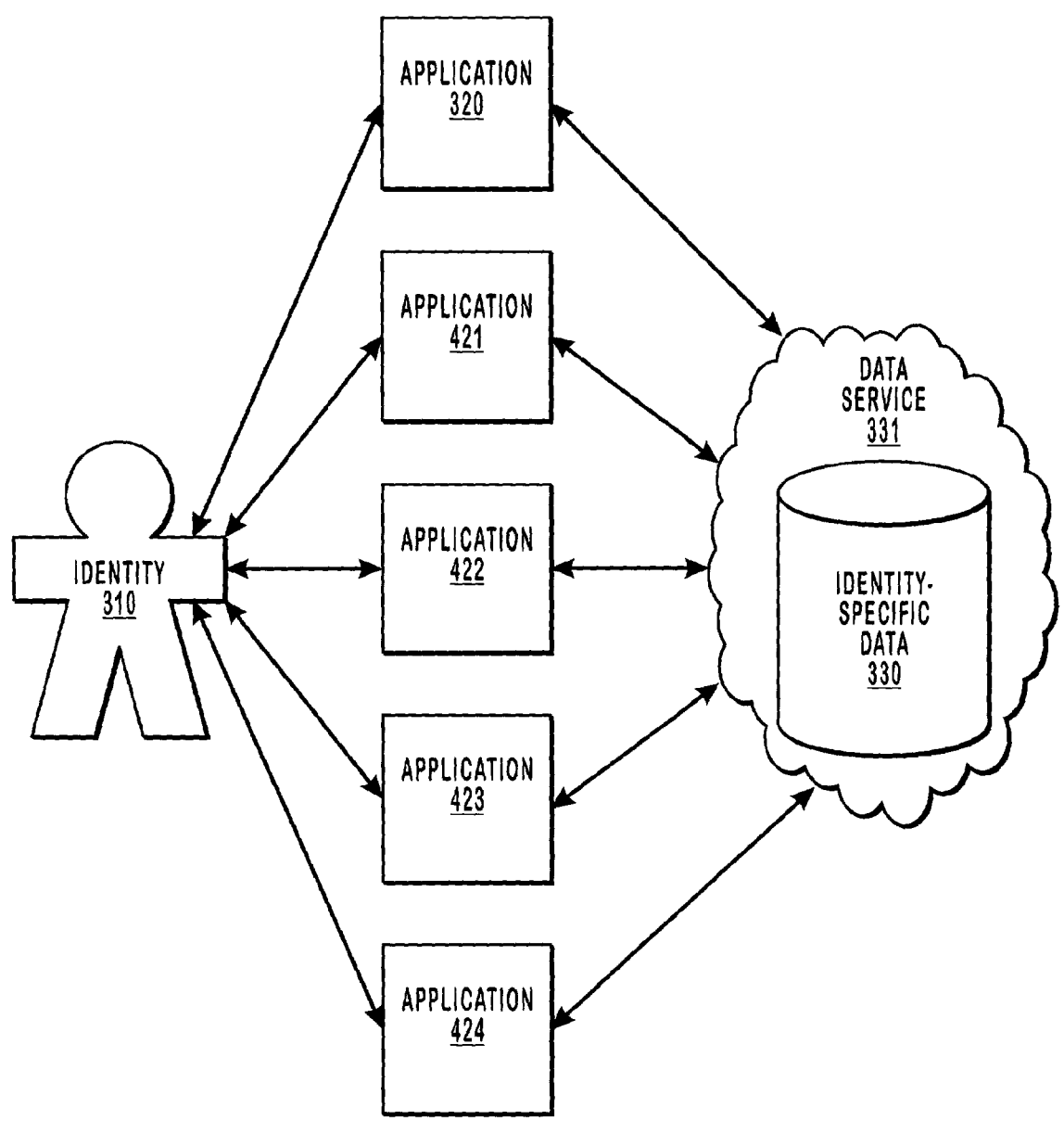
FIG. 4 schematically illustrates the model of FIG. 3 in which multiple applications interact with the same set of data.

The data service 331 is represented by a cloud shape to emphasize that the data service 331 is accessible regardless of the application and device used so long as the application and device are capable of implementing the principles of the present invention. FIG. 4 illustrates this principle by showing the model of FIG. 3 in which the identity 310 accesses the identity-specific data 330 through multiple applications 320 and 421 through 424. FIG. 4 may be contrasted with FIG. 2. Instead of each application owning its own data, each application accesses the relevant identity-specific data from data service 331.

Although not required, the applications 320 and 421 through 424 may perform different functions and be implemented on different devices. For example, the identity 310 might use a desktop Personal Computer or "PC" running application 320 to draft a word processing document, and then move to a Personal Digital Assistant (hereinafter, "PDA") that runs application 421 to continue editing. The identity may accomplish this even though the word processing applications locally represent the word processing document using incompatible data structures, and without having to synchronize the word processing document between the desktop PC and the PDA. From the identity's perspective, it is as though the identity 310 retrieves the word processing document from an ever-present and ever-accessible sky filled with all of the associated identity-specific data.

Not only may the identity access its own identity-specific data, but the identity may authorize other individuals and applications to perform specific operations on all or portions of the identity's data. For example, an identity may authorize a Web-based weather application to read, but not alter, the identity's address information to extract the zip code or town so that weather forecasts may be tailored to the identity. If the identity were to move, the identity would update the address information. Accordingly, the next time the identity runs the weather application, the weather application would provide a weather forecast specific to the new address. Thus, with just this authorization, the identity has avoided having to re-enter zip code information directly to the weather application. Many applications may benefit by avoiding this kind of manual entry of data using this kind of authorization. The weather application mentioned herein is just one example of such an application.

As another example, suppose that the identity is to sign up for a Web-based grocery delivery service. Instead of having to enter in the personal information and a grocery list, the identity may authorize the grocery delivery service application to have access to the address information as well as a grocery list for weekly delivery. The identity has avoided having to manually enter the information at the time it signed up for the service. Instead, the personal information and the grocery list were made accessible to the application through simple authorizations. Should the identity desire to switch Web-based grocery delivery services, the identity would retract authorizations granted to the previous application, and grant the same authorizations to the new applications, thus again avoiding having to reenter the information.

Figure 5:
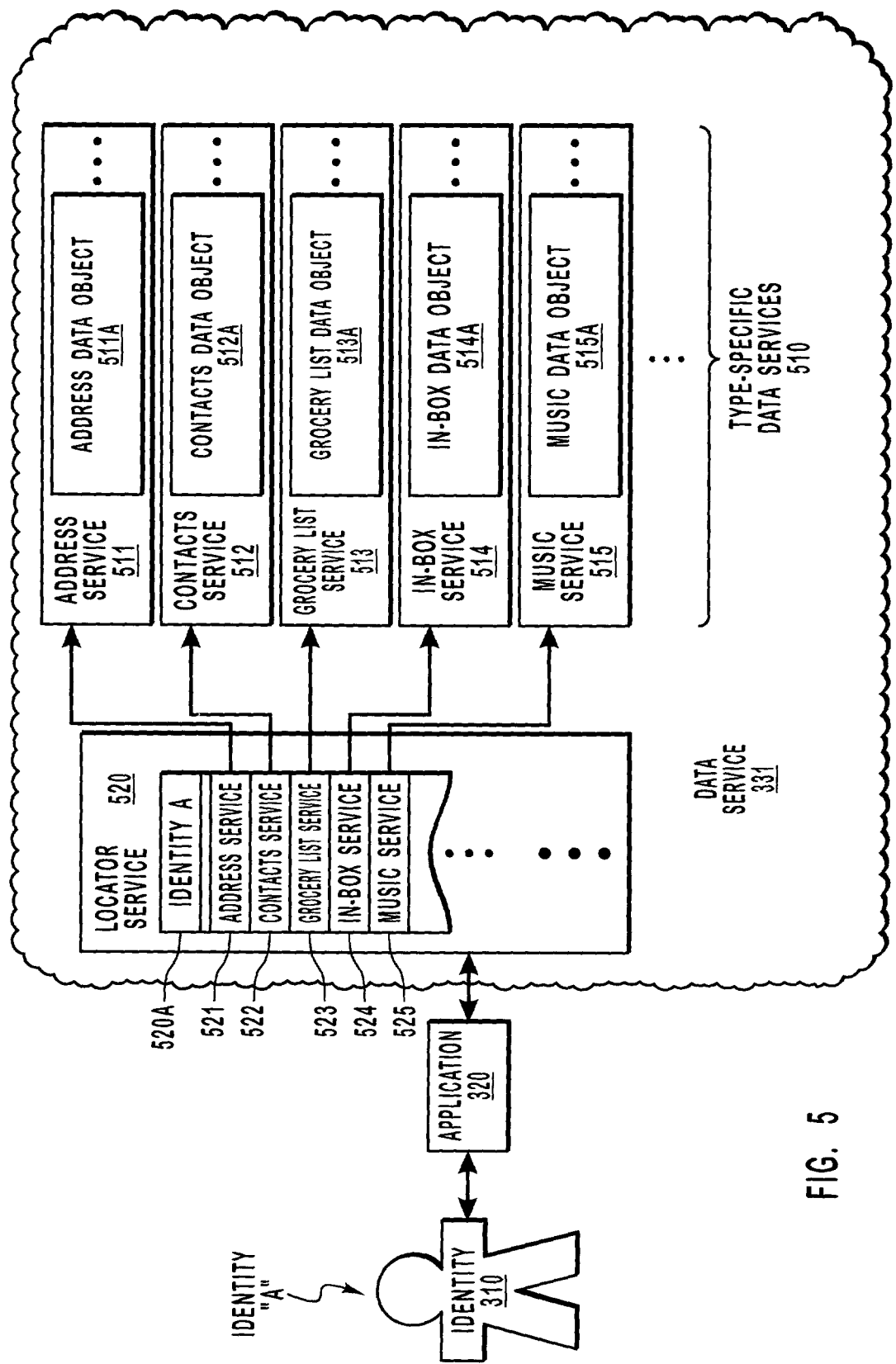
FIG. 5 illustrates the model of FIG. 3 in which further details are illustrated for the data service that provides the data and the strong coupling between the identity and the data.
Figure 6:
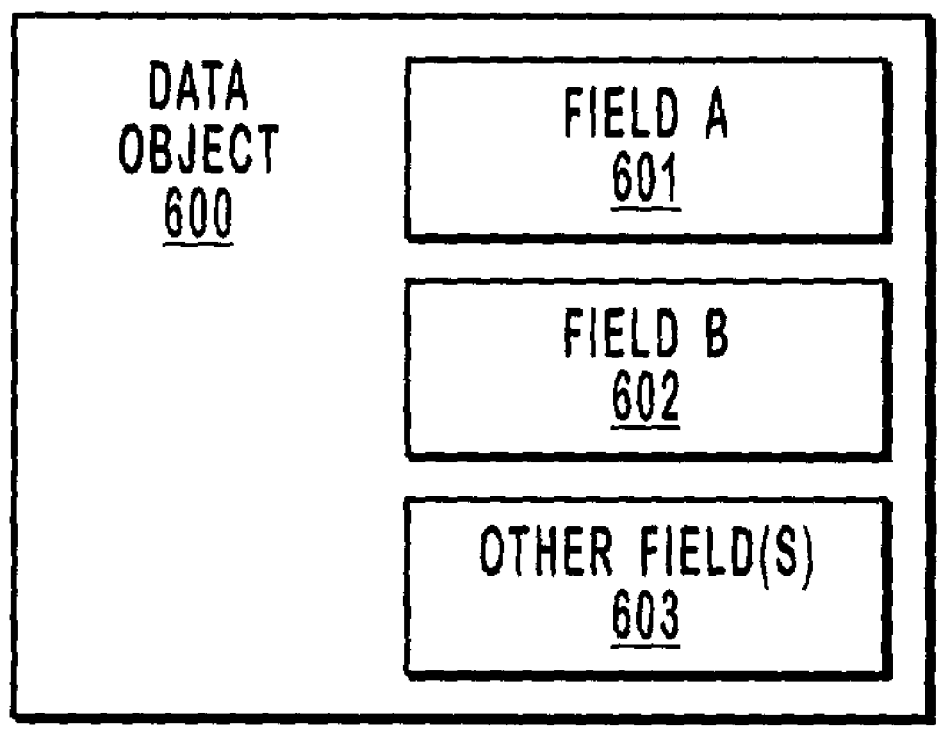
FIG. 6 illustrates a data object in which the meaning of the various fields of the data object is understood by interpretation in light of a schema.

FIG. 5 shows more details regarding how the data access model 300 accomplishes this flexible organization and management of data on an identity-specific basis. The data service 331 includes a variety of type-specific data services 510. Each service manages a specific type of data object for one or more identities. FIG. 6 illustrates the general format of such a data object. The data object 600 includes multiple fields including for example, field A 601 field B 602 and other fields 603.

The structure of the data object follows a specific set of rules or "schema" regarding where the fields are placed in a data structure, and the particular meaning of the fields. The schema may have an initial set of rules regarding the placement and meaning of an initial set of fields. However, the schema may also provide rules for adding more fields to the data structure, thus allowing flexibility in the amount and types of fields that a schema may support. Thus, the schema may be extensible. As long as an application follows the set of rules when interpreting the data object, the application will be able to interpret the meaning and content of the various fields within the data object. Thus, if a schema is widely recognized and followed, the data object may be interpreted by a wide variety of applications. In one embodiment, the data object is organized as an extenstible Markup Language (XML) document. XML documents are beneficial and capable of defining a data object that follows a schema because XML provides for name-value pairing or "tags" where the meaning of the value may be implied by the name.

Once again, the data service 331 may include many type-specific data services 510. In the illustrated example of FIG. 5, the type-specific data services 510 include a variety of data objects associated with identity A. For example, address service 511 manages an address data object 511A, contacts service 512 maintains a contacts data object 512A, grocery list service 513 maintains a grocery list data object 513A for storing a grocery list, in-box service 514 maintains an in-box data object 514A, and music service 515 maintains a music data object 515A, each of the data objects associated with identity A. The data object 511A may be not in the clear as stored or transmitted. For example, the data object 511A may be encrypted or compressed, in which case decryption or decompression, respectively, may be necessary before the schematized structure may be discernable.

The type-specific data services 510 may also include many other types of type-specific data services as represented by the vertical ellipses in FIG. 5. For example, the type-specific data services may include a data service that maintains settings for various applications that are used by an identity, a data service that maintains a list of physical devices (and their capabilities) which associate with and interact with a given identity, a favorite Web site service that maintains a list of the identity's designated favorite Web sites, a location service that maintains a list of location-centric information about an identity, and the like.

For clarity, only an example list of type-specific data services has been mentioned. It will be apparent, in light of this disclosure, that the variety of type-specific data services is essentially unlimited. Each of the type-specific services maintains identity-specific data objects that follow a schema according to the type of data. In addition, there may be a number of type-specific services that maintain data structures of a particular type.

The type-specific data services 510 may be located anywhere in a network. However, in order to maximize availability, the type-specific data services 510 may be accessible via the Internet. Thus, the type-specific data services may be provided by a Web site or service and may be accessed via, for example, a World Wide Web address or other Uniform Resource Identifier (URI). As used in this description or in the claims, a Uniform Resource Identifier or URI is defined as any local or network addressing or naming mechanism and is broad enough to encompasses Globally Unique IDs (or GUIDs), Internet Protocol (IP) addresses, or yet to be developed addressing or naming mechanisms. Also, the type-specific data services may also be implemented by a variety of connected computing devices. It is not essential to the invention the particular type of computing device or devices that implements the data service. Any connected devices may implement the data service such as personal computers, hand-held devices, multi-processor systems, microprocessor-based or programmable consumer electronics, network PCs, minicomputers, mainframe computers, and the like, or combinations thereof.

The number of type-specific data services 510 in the data service 331 may be quite large. In addition, the number of identities for which the data service 331 maintains identity-centric data may also be quite large. Accordingly, to assist in locating a particular type-specific data service corresponding to a particular individual, the data service 331 includes a locator service 520.

The locator service 520 organizes relevant type-specific data service addresses on an identity-specific basis. For example, the locator service 520 also maintains a data object 520A that represents a list of address corresponding to the type-specific data services that maintain identity A's data. For example, data object 520 includes the address service address 521, the contacts service address 522, the grocery list service address 523, the in-box service address 524, and the music service address 525. An arrow represents the logical addressing relationship where the address at the tail of the arrow is the address for the service at the head of the arrow.

The address locator service 520 may also be located in any network. However, to facilitate availability yet again, the locator service 520 may be implemented on the Internet in the form of a Web site. In this case, the locator service 520 may be accessed via a World Wide Web address or other URI.

The identity 310, the application 320, and the data services 331 interact such that the data access model of FIG. 3 is emulated. More regarding the structure and operation of the architecture illustrated in FIGS. 3 through 5 is described in commonly-owned, co-pending, U.S. patent application Ser. No. 10/003,750, filed on the same date herewith, and entitled "Identity-Centric Data Access", which co-pending application is incorporated herein by reference in its entirety.

The various components of FIG. 5 interact using a messaging data structure that identifies the data object that is to be operated upon by identifying the identity associated with the data object, and by identifying the particular schema associated with the data object. For example, the messaging data structure may identify that the data object of interest is the calendar data object associated with identity A. In the event that there are more than one calendar data objects associated with identity A, then the messaging data structure may also identify the particular instance using a unique identifier assigned to that particular instance. For example, perhaps there is one calendar data object for work-related items, and one for personal items. In this manner, the target data object desired to be operated upon may be uniquely identified.

Figure 7:
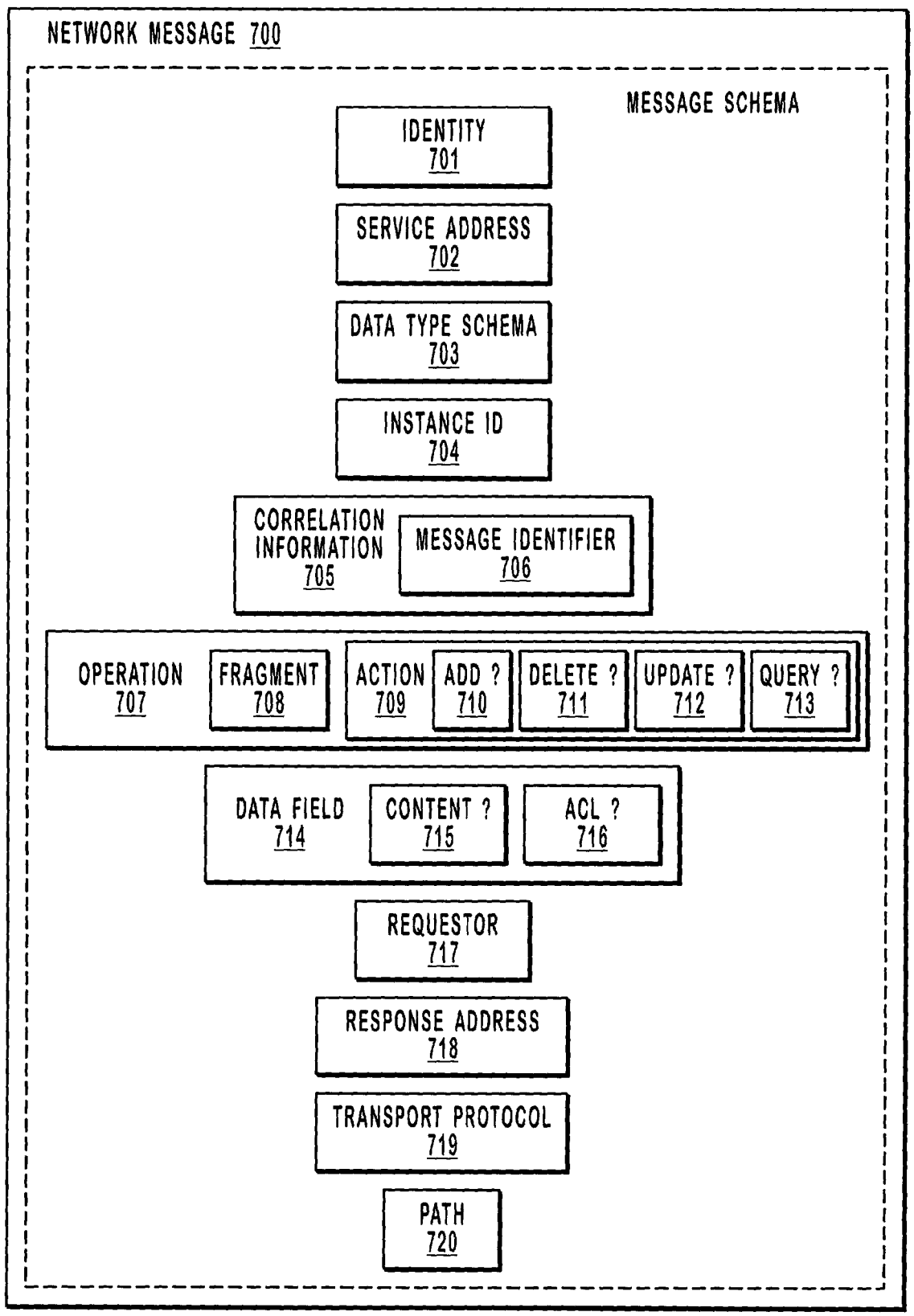
FIG. 7 illustrates a data structure of request message that is in accordance with a message format, and that identifies a desired data object in an identity-centric manner in accordance with the present invention.

FIG. 7 schematically illustrates an example data structure of a network message 700 that represent a request for service in accordance with the principles of the present invention. The data structure 700 follows a schema so that the meaning of the data structure 700 may be interpreted by any application or service that is capable of following the schema. The fact that the fields of the data structure 700 are represented by the schema is represented in FIG. 7 by the fields being encapsulated by a dashed box In this description and in the claims, a "data type schema" is defined as a schema associated with one of the type-specific data services 510 or the locator service 520. A "message schema" is defines as a schema used by the data structure 700. The message schema may be broad enough to allow for the inclusion of embodiments of data type schemas. For example, the message may include one or more entire calendar data structures or other types of data structures as appropriate.

The data structure 700 includes a number of data fields for which the meaning of the data field is implied by the message schema based on its organization within the data structure 700. Each of the data fields in the data structure 700 may be a set of one or more data fields dispersed anywhere throughout the data structure 700, so long as the message schema is adhered to. The exact message schema is arbitrary so long as the schema is recognized by the service that interprets the meaning of the data structure 700. In this description and in the claims, a "message schema" is defines as a set of rules that defines how fields are located within the message and the corresponding meaning of the field. A message schema may include, for example, an HTTP request where the method specifies the operation to be performed, and the URL includes structured information in accordance with a set of rules. The message schema may also include a CPU operation code such as a read or write request. The message schema may also include a formal message schema. In this description and in the claims, a "formal message schema" is defined as a message schema in which each of the fields in the data structure are associated with another field that identifies the meaning of the field. For example, in the eXtensible Markup Language (XML), a tag is associated with each field value, the tag representing the meaning of the corresponding value.

Data field 701 identifies the identity whose data object is desired to be operated upon. In this description and in the claims, a data field "identifies" a particular item even if further processing is required after parsing the data field. For example, the data field may identify a particular item even if the particular item needs to be decoded, decrypted or decompressed prior to being interpreted. In addition, the identification may not be human-readable. Instead, the identification of one or more items may not be human-readable, and may have been pre-negotiated for used during one or more sessions.

Data field 702 identifies the address of a service that manages data objects for a number of identities including the identity whose data object is desired to be operated upon. The address of the service may be, for example, a Uniform Resource Identifier or World Wide Web address if the data model of FIG. 4 is implemented over the Internet. As previously mentioned, the address of one of the type-specific data services 510 may be obtained using the locator service 520. In addition, the address of the locator service 520 may be, for example, a function of the identity name.

Data field 703 identifies the data type schema. The locator service 520 may use the identification of the identity and the identification of the data type schema to locate the corresponding service address as described in further detail in the co-pending application entitled "Identity-Centric Data Access" previously incorporated by reference. In addition, the particular data service that receives the data structure 700 as a request for service may use the identification of the identity and the identification of the data type schema to identify the particular data object that is desired to be operated upon. In some instances in which a particular data type service only manages data objects of the particular data type schema, the data type schema may be implied by the very fact that the request was received by the service. In other words, the service address may imply the particular data type schema. However, to facilitate interaction with services in which data objects following multiple schemas are managed by a single service (and thus the data type schema may not be inferred from the service address), an express statement of the particular data type schema may be included in the messaging data structure.

Data field 704 identifies a particular instance of a data object that follows the data type schema and that is associated with the identity. This identification is useful in services in which there may be more than one such data object. For example, identity A may have two calendar data objects, one for work-related calendar information, and one for personal calendar information. The data field 704 allows for a precise identification of the data object desired in such services. The service may then use the identification of the identity, the identification of the data type schema, and the identification of the instance to thereby identify the target data object.

Data field 705 identifies correlation information that may be used to determine that a particular message is a response to a particular request. In one example, the correlation information is a unique message identifier 706. Whenever a response is to follow a request, the request should include correlation information to allow the requestor to understand that a return message is a response to the request. In another example, some of the text of the request message may itself be used in the response to allow this correlation.

If the underlying message transfer protocol or technique used to transmit the request data structure 700 is a request/response oriented protocol such as HyperText Transport Protocol (HTTP), this correlation information may optionally be managed by the underlying protocol. In that case, the correlation information may include correlation information managed by the underlying protocol, as well as supplemental correlation information that is not managed by the underlying protocol. However, if the underlying message transfer protocol is not request/response oriented such as Simple Mail Transfer Protocol (SMTP), the correlation information is included in portions of the request that are not managed by the transport protocol.

Data field 707 identifies the operation to be performed on the particular data object. The data field 707 may include a data field 708 that identifies a fragment of the data object to be operated upon. The fragment may include the entire data object, some elements of the data object, or a single element of the data object. The data field 707 may also include a data field 709 that identifies an action to be performed on the fragment. For example, the action may be to add the fragment (action 710), delete the fragment (action 711), update or modify the fragment (action 712), or query about the fragment (action 713).

Some data objects represent actual content of interest (e.g., calendar items, contacts, tasks, or the like) while other data objects represent access control list information concerning a content-based data object. The collection of the content-based data object along with its corresponding access control list data object may also be viewed as being a data object. Accordingly, to focus on the precise data object that the operation is to be performed upon, the data structure 700 may include a data field 714 that represents whether or not the operation is to be performed on the content data object (715) or whether the operation is to be performed on the access control list data object (716).

Data field 717 identifies a requestor of the operation. The requestor may be verified with the access control list portion of the data object to determine whether the requestor has the rights to perform the requested operation. Thus, the access control list data object controls who has what rights to the access control list data object and the corresponding content data object.

Data field 718 identifies a response address where a response to the request should be transmitted. Of course, the default setting for the response address may be the originating address for the request should there be no response address listed.

Data field 719 identifies a protocol used to transport the request in cases in which a selection of transport protocols may be used to transmit the messaging data structure 700. For example, the data field 719 may identify HTTP or SMTP as the transport protocol to be used.

A data field 720 may be used to identify a path that the data structure 700 is to take on its way to the target service. The data field 720 may also identify a path for the corresponding response. For example, the path may include specified intermediary computing systems. For each segment along the path, the path field may also specify the transport protocol to use in transporting along the segment. Thus, a request may be transmitted using HTTP, and a response returned via SMTP. Furthermore, a request (or a response to the request) may be transmitted using both HTTP and SMTP, where HTTP is used for one segment, and SMTP is used for another. Thus, the data structure 700 allows for fine-grained control over how messages are transmitted.

In one embodiment, the data structure 700 is implemented as an XML document embedded within a Simple Object Access Protocol (SOAP) envelope although the present invention is not so limited. The following illustrates an example of a request data structure in accordance with the present invention implemented as an XML document embedded in a SOAP envelope.

Within the path information, line 9 identifies that the data structure represents a request. Line 10 identifies the service address in URL form and is comparable to service address field 702 of FIG. 7. Lines 11 through 13 identify the URL of an intermediary computing system that the request should traverse in order to transmit the request to the service. Lines 12 identifies the transport protocol (e.g., smxp) to use when communicating with this intermediary computing system. Lines 14–17 identify the reverse path for use when transmitting the response by specifying the URL of an interme-

```
1.      <s:Envelope xmlns:s="http://schemas.xmlsoap.org/soap/envelope/"
2.                  xmlns:srp="http://schemas.xmlsoap.org/rp/"
3.                  xmlns:m="http://schemas.microsoft.com/hs/2001/10/myProfile"
4.                  xmlns:hs="http://schemas.microsoft.com/hs/2001/10/core"
5.                  xmlns:ss="http://schemas.xmlsoap.org/soap/security/2000-12"
6.                  >
7.          <s:Header>
8.              <srp:path>
9.
<srp:action>http://schemas.microsoft.com/hs/2001/10/core#request</srp:action>
10.
<srp:to>http://vbe1.vfd1.myProfile.contoso.com/chloe@contoso.com/</srp:to>
11.             <srp:fwd>
12.                 <srp:via>smxp://165.12.33.12:1280</srp:via>
13.             </srp:fwd>
14.             <srp:rev>
15.                 <srp:via>smxp://165.12.33.12:1281</srp:via>
16.                 <srp:via>http://response.mydevmachine</srp:via>
17.             </srp:rev>
18.             <srp:id>uuid:76343E4501</srp:id>
19.         </srp:path>
20.         <ss:licenses>
21.             <hs:identity>
22.                 <hs:kerberos>865E1DB32AC3</hs:kerberos>
23.             </hs:identity>
24.         </ss:licenses>
25.         <hs:request  service="myprofile" document="content" method="update"
genResponse="always">
26.             <hs:key  puid="e09fB22233334444"  instance="chloe@contoso.com"
cluster="vbe1.vfe1"/>
27.         </hs:request>
28.     </s:Header>
29.     <s:Body>
30.         <hs:insertRequest select="/hs:myProfile">
31.             <m:address>
32.                 <m:cat @ref="system/home"/>
33.                 <m:officialAddressLine        xml:lang="en">1236      Lisa
Lane</m:officialAddressLine>
34.                 <m:primaryCity xml:lang="en">Los Fiction</m:primaryCity>
35.             </m:address>
36.         </hs:insertRequest>
37.     </s:Body>
38. </s:Envelope>
```

Each of the lines of the request is numbered for purposes of clarity in describing this embodiment, but would not be numbered in the actual XML document. Lines 1–6 is the SOAP envelope opening tag and corresponds to line 38 which is the SOAP envelope closing tag. The SOAP envelope opening tag specifies abbreviations (e.g., "s", "srp", "m", "hs" and "ss") for certain data formats or schemas. The remaining portion (lines 7–37) represents the content of the SOAP envelope.

Line 7 is an opening header tag that corresponds to line 28, which is a closing header tag. Thus, lines 8–27 are identified as being header information.

Line 8 is an opening path header tag that corresponds to line 19, which is a closing path header tag. Thus, lines 9–18 are identified as including path information and is comparable to path field 720 of FIG. 7.

diary computing system. The reverse path transport protocols are also specified for each segment. For example, line 15 specifies the use of smxp, while line 16 specifies the use of http. Thus, these portions of lines 14–17 are comparable to protocol field 719 of FIG. 7. Line 16 specifies a response address in URL form and is comparable to response address field 718 of FIG. 7. Line 18 identifies a message ID and is comparable to the message identifier field 706 corresponding to the correlation information field 705 of FIG. 7.

Lines 20–24 identifies licenses for use when determining whether or not the requesting entity is authorized to perform certain actions such as the requested action. Lines 21–23 identify the requester using the conventional Kerberos authentication method and are comparable to the requester field 717 of FIG. 7. The information is encoded so as to allow for authentication without the risk of transmitting the requestor's authentication credentials in the clear.

Line 25 represents an opening request tag that corresponds to line 27, which represents a closing request tag. The opening request tag includes attributes that identify the schema (e.g., "myprofile") of the target data object and is comparable to the data type schema field 703 of FIG. 7. Another attribute identifies the document class (e.g., "content") and is comparable to data field 714 of FIG. 7. Yet another attribute identifies the operation method (e.g., "update") and, in conjunction with the body information described below, identifies an actual update operation to be performed on the target data object. Line 26 represents the identity or owner of the data and is comparable to the identity field 701 of FIG. 7. Line 26 also represents the instance and is comparable to instance ID field 704 of FIG. 7. Lines 29–37 represent the body of the request and represent specific information to be updated. In this example, the home address is updated to "1236 Lisa Lane" in the town of Los Fiction. In this manner, the messaging data structure may identify and manipulate the target data object in an dentity-centric manner.

Figure 9:
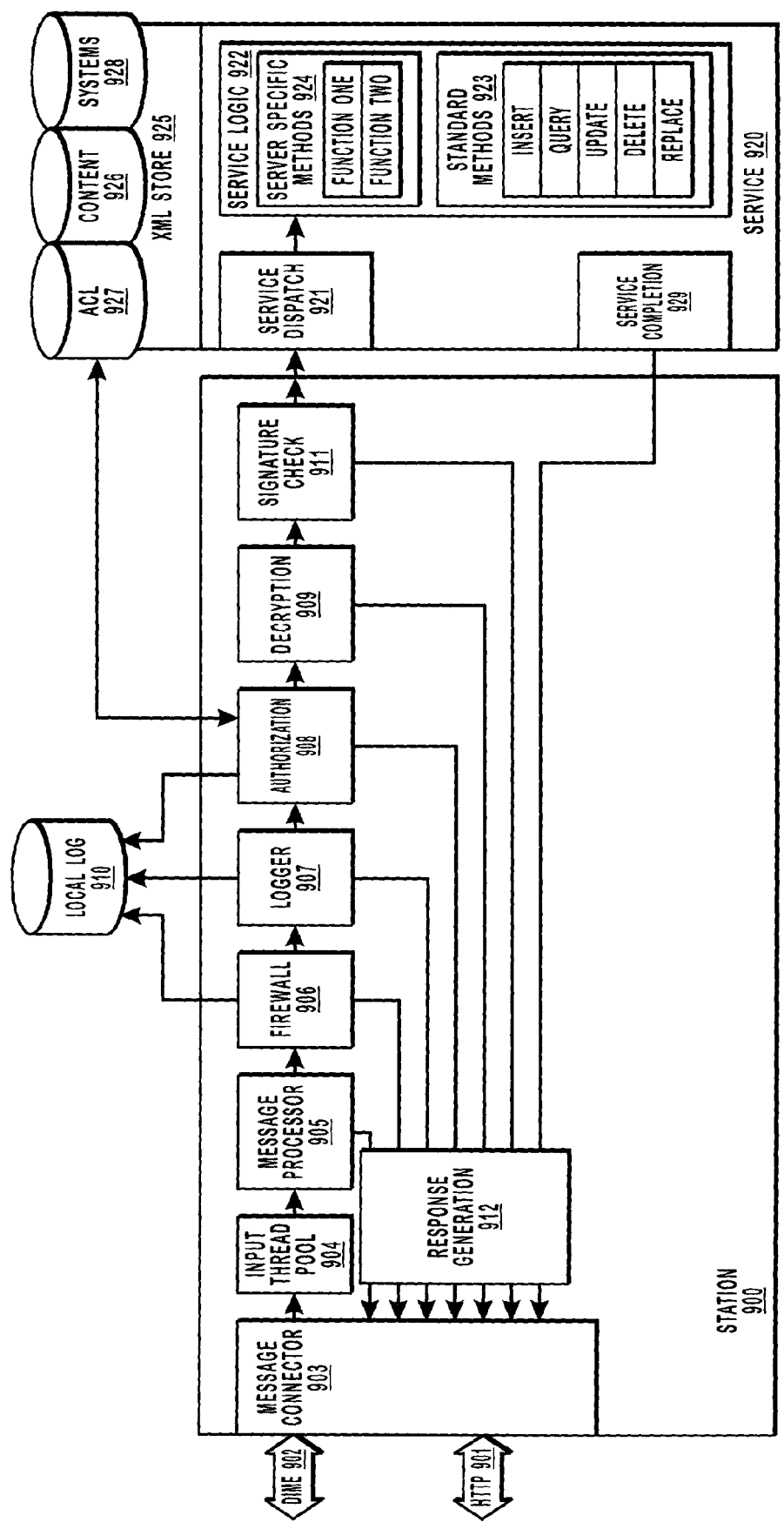
FIG. 9 schematically illustrates a station that may perform centralized processing of communications between the applications and the services.

In one example embodiment, all of the requests are filtered through a centralized station that consolidates and performs functions that are common to each of the services. FIG. 9 illustrates a more specific diagram of the station 900 and one of the services identified as service 920. The station 900 receives a request from an application using a network protocol such as HyperText Transport Protocol (HTTP) represented by arrow 901, or Direct Internet Message Encapsulation (DIME) represented by arrow 902. The station 900 includes a message connector 903, which receives the request and passes the message up the protocol stack so that the request may be further processed. The request is then provided to an input thread pool 904 for temporary storage.

The request is then parsed at a message processor 905 which parses the request into various components. For example, in one embodiment, the request is a Simple Object Access Protocol (SOAP) message in which case the message processor 905 parses using the appropriate SOAP protocol. The message processor 905 may also perform some preliminary level of rule checking to make sure the request should be further processed. For example, if the request is to manipulate a data structure that none of the services manage, the message processor 905 may abstain from passing the request further down the process flow, and instead simply generate an error message using the response generation module 912 to be returned via the message connector 903.

The request may then be filtered by a firewall 906 and then logged using a logger 907. A firewall may also reject a request and generate an error message using the response generation module 912 that is returned as a response via the message connector 903. A local log 910 may receive and store event information received from the firewall 906, as well as normal logging information received from the logger 907 such as the following for each received request: time received, method type, attribute types, and address of request. Then, an authorization module 908 determines if the request is authorized to perform the requested operation on the target data structure. If authorization fails, then an error message is returned via the response generation module 912 and the message connector 903. Then authorization module 908 may consult the ACL database 927.

In one example, the request is in the form of an SOAP envelope, which contains unencrypted header information, as well as an optional encrypted body portion. A decryption module 909 decrypts the body of the request. Then, a signature checker 911 checks any signatures associated with the request to guard against tampering. Any failed decryption or signature checking may also be returned to the requestor in the form of an error message generated by the response generation module 912.

After signature checking, the station 900 then passes information sufficient to accomplish the requested operation to the appropriate target service. This information includes a message that the request is authorized, the scope of access permissions, an identification of the requested method, and any needed request details.

The information is then passed to the service dispatch module 921 of the service 920. The service logic 922 then receives and processes the information. The service logic 922 is capable of perform standard methods 923 including insert, query, update, delete, and replace as well as possibly some service specific methods 924. In order to execute the requested operation, the service logic accesses a data store that store the data structures to be manipulated. In one embodiment, the data structures to be operated upon are eXtensible Markup Language (XML) documents in which case the data store is an XML store 925. The data structures to be accessed may be content documents 926, ACL documents 927 or system documents 928.

Once the requested operation is performed on the target data structure using the service logic 922 interacting with the XML store 925, response information is provided to service completion module 929. The response information is then passed to response generation module 912 for generation of an appropriate response. The response is then returned to the user via the message connector 903.

Having now described the principles of the present invention in detail, it is noted that the precise hardware configuration that implements the above-described features is not important to the present invention. For example, the locator service 520 may be implemented by one computing device or device cluster. In addition, a computing device or device cluster may implement groups of one or more of the other identity-based services such as those illustrated in FIG. 5. Also, the application 320 may be implemented on any device. Indeed, one of the unique features of the present invention is its lack of dependence on the hardware operating environment.

Figure 8:
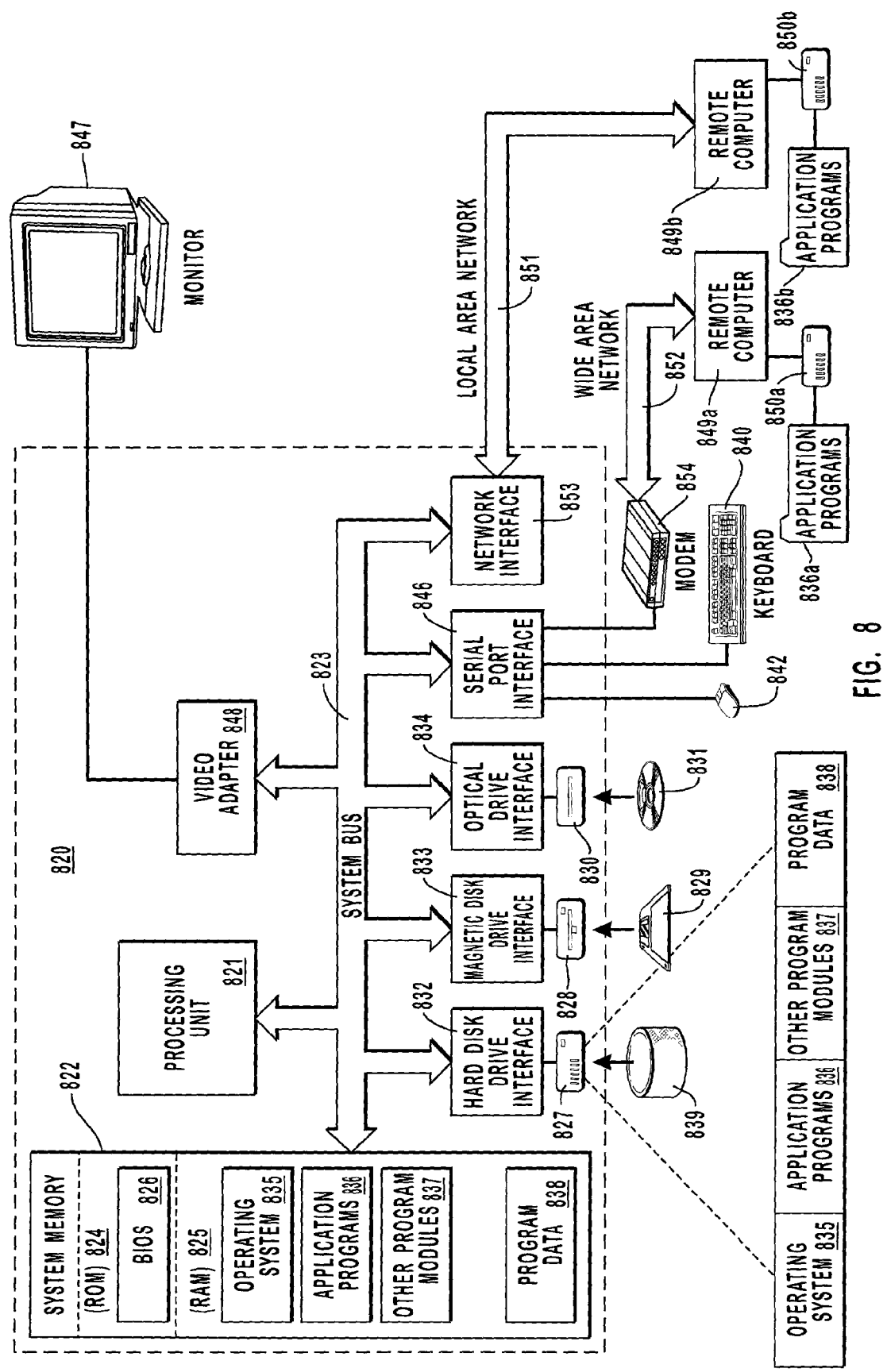
FIG. 8 schematically illustrates a computing device that may implement the features of the present invention.

Nevertheless, for the sake of completeness, FIG. 8 illustrates an example computing system that may itself or in combination with other computing devices implement all or portions of the features described above. The example system includes a general purpose computing device in the form of a conventional computing device 820, including a processing unit 821, a system memory 822, and a system bus 823 that couples various system components including the system memory 822 to the processing unit 821. The system bus 823 may be any of several types of bus structures including a memory bus or memory controller, a peripheral bus, and a local bus using any of a variety of bus architectures. The system memory includes read only memory (ROM) 824 and random access memory (RAM) 825. A basic input/output system (BIOS) 826, containing the basic routines that help transfer information between elements within the computer 820, such as during start-up, may be stored in ROM 824.

The computer 820 may also include a magnetic hard disk drive 827 for reading from and writing to a magnetic hard disk 839, a magnetic disk drive 828 for reading from or writing to a removable magnetic disk 829, and an optical disk drive 830 for reading from or writing to removable optical disk 831 such as a CD-ROM or other optical media. The magnetic hard disk drive 827, magnetic disk drive 828, and optical disk drive 830 are connected to the system bus 823 by a hard disk drive interface 832, a magnetic disk drive-interface 833, and an optical drive interface 834, respectively. The drives and their associated computer-readable media provide nonvolatile storage of computer-executable instructions, data structures, program modules and other data for the computer 820. Although the exemplary environment described herein employs a magnetic hard disk 839, a removable magnetic disk 829 and a removable optical disk 831, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 839, magnetic disk 829, optical disk 831, ROM 824 or RAM 825, including an operating system 835, one or more application programs 836, other program modules 837, and program data 838. For example, application 320 and the various data services may each be an application program such as application programs 836.

A user may enter commands and information into the computer 820 through keyboard 840, pointing device 842, or other input devices (not shown), such as a microphone, joy stick, game pad, satellite dish, scanner, or the like. These and other input devices are often connected to the processing unit 821 through a serial port interface 846 coupled to system bus 823. Alternatively, the input devices may be connected by other interfaces, such as a parallel port, a game port or a universal serial bus (USB). A monitor 847 or another display device is also connected to system bus 823 via an interface, such as video adapter 848. In addition to the monitor, personal computers typically include other peripheral output devices (not shown), such as speakers and printers.

The computer 820 may operate in a networked environment using logical connections to one or more remote computers, such as remote computers 849a and 849b. Remote computers 849a and 849b may each be another personal computer, a server, a router, a network PC, a peer device or other common network node, and typically include many or all of the elements described above relative to the computer 820, although only memory storage devices 850a and 850b and their associated application programs 836a and 836b have been illustrated in FIG. 8. The logical connections depicted in FIG. 8 include a local area network (LAN) 851 and a wide area network (WAN) 852 that are presented here by way of example and not limitation. Such networking environments are commonplace in office-wide or enterprise-wide computer networks, intranets and the Internet. These networks may be the means whereby the network messages are communicated between the application 320 and the data service 331.

When used in a LAN networking environment, the computer 820 is connected to the local network 851 through a network interface or adapter 853. When used in a WAN networking environment, the computer 820 may include a modem 854, a wireless link, or other means for establishing communications over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing communications over wide area network 852 may be used.

Accordingly, the principles of the present invention allow for the convenient organization and manipulation of data on an identity-centric basis. In particular, a requestor may cause a computing device to generate request information in accordance with a schema. The request may then be transmitted to a receiving computing system which may extract and interpret the meaning of the various request fields in accordance with the schema.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer network that includes a plurality of applications that operate on data objects associated with identities, the computer network also including a plurality of services that maintain data objects associated with the identity, each service managing at least data objects that follow a corresponding data type schema, a computer-readable medium storing or carrying thereon a data structure that represents a request to perform an operation on a data object associated with an identity, the data structure following a message schema, the data structure including the following data fields that are structured in accordance with the message schema:
   one or more data fields that identify one of a plurality of identities who owns a data object to be accessed by one of a plurality of mobile applications in accordance with an identity-centric, as opposed to an application-centric, data access model;
   one or more data fields that identify one or more services that manage a plurality of data objects for the plurality of identities including the identity who owns the data object to be accessed, at least some of the data objects being organized in accordance with a data type schema;
   one or more data fields that identify one of a plurality of data type schemas corresponding to one of the plurality of mobile applications that access the plurality of data objects managed by the one or more services, wherein a particular data object to be accessed is identifiable from at least the identification of the identity who owns the data object to be accessed and the identification of the data type schema; and
   one or more data fields that identify an operation to be performed on the particular data object.

2. A computer-readable medium in accordance with claim 1, wherein the message schema follows a formal message schema.

3. A computer-readable medium in accordance with claim 1, further comprising the following:
   one or more data fields that identify correlation information for use in correlating the request with a response to the request.

4. A computer-readable medium in accordance with claim 3, wherein the one or more data fields that identify correlation information are included in header information defined by an underlying transport protocol used to transmit the request.

5. A computer-readable medium in accordance with claim 4, wherein the data structure further includes the following:
   one or more data fields that identify a transport protocol used to transmit the request.

6. A computer-readable medium in accordance with claim 5, where the one or more data fields that identify a transport protocol identify a version of HyperText Transport Protocol (HTTP) as the transport protocol used to transmit the request.

7. A computer-readable medium in accordance with claim 3, wherein the one or more data fields that identify the correlation information comprises the following:
one or more data fields that identifies a message identifier.

8. A computer-readable medium in accordance with claim 7, wherein the transport protocol used to transport the request is not request/response oriented.

9. A computer-readable medium in accordance with claim 7, wherein the data structure further includes the following:
one or more data fields that identifies a transport protocol used to transmit the request.

10. A computer-readable medium in accordance with claim 9, where the one or more data fields that identifies a transport protocol identifies a version of Simple Mail Transport Protocol (SMTP) as the transport protocol used to transmit the request.

11. A computer-readable medium in accordance with claim 1, wherein the one or more data fields that identify the data type schema are human-readable.

12. A computer-readable medium in accordance with claim 1, wherein the one or more data fields that identify the data type schema are not human-readable.

13. A computer-readable medium in accordance with claim 1, wherein the data structure further includes the following:
one or more data fields that identify an instance of a data object that follows the data type schema and that is associated with the identity, wherein the particular data object to be accessed is identifiable from at least the identification of the identity, the identification of the data type schema, and the identification of the instance.

14. A computer-readable medium in accordance with claim 13, wherein the data structure further includes the following:
one or more data fields that identify a requestor of the operation.

15. A computer-readable medium in accordance with claim 14, wherein the data structure further includes the following:
one or more data fields that identify a response address where a response to the request is to be directed.

16. A computer-readable medium in accordance with claim 15, wherein the data structure further includes the following:
one or more data fields that identify a protocol used to transport the request.

17. A computer-readable medium in accordance with claim 14, wherein the data structure further includes the following:
one or more data fields that identify a protocol used to transport the request.

18. A computer-readable medium in accordance with claim 13, wherein the data structure further includes the following:
one or more data field that identify a response address where a response to the request is to be directed.

19. A computer-readable medium in accordance with claim 18, wherein the data structure further includes the following:
one or more data fields that identify a protocol used to transport the request.

20. A computer-readable medium in accordance with claim 13, wherein the data structure further includes the following:
one or more data fields that identify a protocol used to transport the request.

21. A computer-readable medium in accordance with claim 1, wherein the data structure further includes the following:
one or more data fields that identify a requestor of the operation.

22. A computer-readable medium in accordance with claim 21, wherein the data structure further includes the following:
one or more data fields that identify a response address where a response to the request is requested to be directed.

23. A computer-readable medium in accordance with claim 22, wherein the data structure further includes the following:
one or more data fields that identify a protocol used to transport the request.

24. A computer-readable medium in accordance with claim 21, wherein the data structure further includes the following:
one or more data fields that identify a protocol used to transport the request.

25. A computer-readable medium in accordance with claim 1, wherein the data structure further includes the following:
one or more data fields that identify a response address where a response to the request is to be directed.

26. A computer-readable medium in accordance with claim 25, wherein the data structure further includes the following:
one or more data fields that identify a protocol used to transport the request.

27. A computer-readable medium in accordance with claim 1, wherein the data structure further includes the following:
one or more data fields that identify a protocol used to transport the request.

28. A computer-readable medium in accordance with claim 1, wherein the computer-readable medium is one or more physical storage media.

29. A computer-readable medium in accordance with claim 1, wherein the computer-readable medium has stored thereon an encoded form of the data structure.

30. A computer-readable medium in accordance with claim 1, wherein the computer-readable medium has stored thereon a plain text form of the data structure.

31. A computer-readable medium in accordance with claim 1, wherein at least some of the one or more data fields that identify the data type schema are the same as at least some of the one or more data fields that identify an address such that the data type schema is at least partially implied by the address of the service.

32. A computer-readable medium in accordance with claim 1, wherein none of the one or more data fields that identify the data type schema are the same as any of the second set of one or more data fields that identify an address.

33. A computer-readable medium in accordance with claim 1, wherein the data object comprises content that includes actual data of interest.

34. A computer-readable medium in accordance with claim 33, wherein the data structure further includes the following:

one or more data fields that identify that the data object comprises content.

35. A computer-readable medium in accordance with claim 1, wherein the data object comprises access control information associated with other data objects.

36. A computer-readable medium in accordance with claim 35, wherein the data structure further includes the following:
one or more data fields that identify that the data object comprises access control information.

37. A computer-readable medium in accordance with claim 1, wherein the one or more data fields that identify the operation to be performed includes the following:
one or more data fields that identify a fragment of the particular data object to be accessed.

38. A computer-readable medium in accordance with claim 37, wherein the one or more data fields that identify a fragment of the particular data object identify that all of the data object is to be accessed.

39. A computer-readable medium in accordance with claim 37, wherein the one or more data fields that identify a fragment of the particular data object identify one or more data fields of the particular data object as being the elements that the operation is to be applied to.

40. A computer-readable medium in accordance with claim 37, wherein the one or more data fields that identify a fragment of the particular data object identify a data field of the particular data object as being the data field that the operation is to be applied to.

41. A computer-readable medium in accordance with claim 37, wherein the one or more data fields that identify the operation to be performed further includes the following:
one or more data fields that identify a specific operation that is to be performed on the fragment of the particular data object.

42. A computer-readable medium in accordance with claim 41, wherein the one or more data fields that identify a specific operation indicate that the fragment is to be added to the particular data object.

43. A computer-readable medium in accordance with claim 41, wherein the one or more data fields that identify a specific operation indicate that the fragment is to be deleted from the identity-specific data.

44. A computer-readable medium in accordance with claim 41, wherein the one or more data fields that identify a specific operation indicate that the fragment is to be modified.

45. A computer-readable medium in accordance with claim 41, wherein the one or more data fields that identify a specific operation indicate a query related to the fragment.

46. A computer-readable medium in accordance with claim 1, wherein the one or more data fields that identify the data type schema identify a data type schema corresponding to personal address information.

47. A computer-readable medium in accordance with claim 1, wherein the one or more data fields that identify the data type schema identify a data type schema corresponding to contacts information.

48. A computer-readable medium in accordance with claim 1, wherein the one or more data fields that identify the data type schema idenitify a data type schema corresponding to grocery list information.

49. A computer-readable medium in accordance with claim 1, wherein the one or more data fields that identify the data type schema identify a data type schema corresponding to in-box information corresponding to the identity.

50. A computer-readable medium in accordance with claim 1, wherein the one or more data fields that identify the data type schema identify a data type schema corresponding to music service information.

51. A computer-readable medium in accordance with claim 1, wherein the one or more data fields that identify the data type schema identify a data type schema corresponding to calendar information.

52. A computer-readable medium in accordance with claim 1, wherein the one or more data fields that identify the data type schema identify a data type schema corresponding to document collections.

53. A computer-readable medium in accordance with claim 1, wherein the one or more data fields that identify the data type schema identify a data type schema corresponding to application setting information.

54. A computer-readable medium in accordance with claim 1, wherein the one or more data fields that identify the data type schema identify a data type schema corresponding to physical device information.

55. A computer-readable medium in accordance with claim 1, wherein the one or more data fields that identify the data type schema identify a data type schema corresponding to favorite Web site information.

56. A computer-readable medium in accordance with claim 1, wherein the one or more data fields that identify an identity identify a person.

57. A computer-readable medium in accordance with claim 1, wherein the one or more data fields that identify an identity identify a group of people.

58. A computer-readable medium in accordance with claim 1, wherein the one or more data fields that identify an identity identify an organization.

59. A computer-readable medium in accordance with claim 1, wherein the data structure further comprises the following:
one or more data fields that identifies a path the request is to take on its way to the service.

60. A computer-readable medium in accordance with claim 59, wherein the one or more data fields that identify a path specify a plurality of routing segments to take on its way to the service.

61. A computer-readable medium in accordance with claim 60, wherein the one or more data fields that identify a path specify a transport protocol to use for the plurality of routing segments, wherein the transport protocol specified is different for at least some of the plurality of routing segments.

62. A computer-readable medium in accordance with claim 59, wherein the data structure further comprises the following:
one or more data fields that identify a path that the corresponding response is to take when responding.

63. A computer-readable medium in accordance with claim 62, wherein the one or more data fields that identify a path that the corresponding response is to take when responding specifies a transport protocol when responding to the request, wherein the transport protocol specified for the response is different than the transport protocol specified for the request.

64. A computer-readable medium in accordance with claim 1, wherein the data type formats are in accordance with a version of the eXtensible Markup Language (XML) specification.

65. A computer-readable medium in accordance with claim 1, wherein the message type format is in accordance with a version of the eXtensible Markup Language (XML) specification.

66. A computer-readable medium in accordance with claim 65, wherein the data structure is structured within a Simple Object Access Protocol (SOAP) envelope.

67. In a computer network that includes a plurality of applications that operate on data objects associated with identities, the computer network also including a plurality of services that maintain data objects associated with the identity, each service managing at least data objects that follow a corresponding data type schema, a method for generating a data structure that represents a request to perform an operation on a data object associated with an identity, the data structure following a message schema, the method including the following:

generating and inserting a first set of one or more data fields into the data structure in accordance with the message schema, the first set of one or more data fields identifying one of a plurality of identities who owns a data object to be accessed by one of a plurality of mobile applications in accordance with an identity-centric, as opposed to an application-centric, data access model;

generating and inserting a second set of one or more data fields into the data structure in accordance with the message schema, the second set of one or more data fields identifying one or more services that manage a plurality of data objects for the plurality of identities including the identity who owns the data object to be accessed, at least some of the data objects being organized in accordance with a data type schema;

generating and inserting a third set of one or more data fields into the data structure in accordance with the message schema, the third set of one or more data fields identifying one of a plurality of data type schemas corresponding to one of the plurality of mobile applications that access the plurality of data objects managed by the one or more services, wherein a particular data object to be accessed is identifiable from at least the identification of the identity who owns the data object to be accessed and the identification of the data type schema;

generating and inserting a fourth set of one or more data fields into the data structure in accordance with the message schema, the fourth set of one or more data fields identifying correlation information for use in correlating the request with a response to the request; and generating and inserting a fifth set of one or more data fields into the data structure in accordance with the message schema, the fifth set of one or more data fields identifying an operation to be performed on the particular data object.

68. A method in accordance with claim 67, further comprising the following:

generating and inserting a sixth set of one or more data fields into the data structure in accordance with the message schema, the sixth set of one or more data fields identifying an instance of a data object that follows the data type schema and that is associated with the identity, wherein the particular data object to be accessed is identifiable from at least the identification of the identity, the identification of the data type schema, and the identification of the instance.

69. A method in accordance with claim 67, further comprising the following:

generating and inserting a sixth set of one or more data fields into the data structure in accordance with the message schema, the sixth set of one or more data fields identifying a request of the operation.

70. A method in accordance with claim 67, further comprising the following:

generating and inserting a sixth set of one or more data fields into the data structure in accordance with the message schema, the sixth set of one or more data fields identifying a response address where a response to the request is to be directed.

71. A method in accordance with claim 67, further comprising the following:

generating and inserting a sixth set of one or more data fields into the data structure in accordance with the message schema, the sixth set of one or more data fields identifying a protocol used to transport the request.

72. A computer program product for use in a computer network that includes a plurality of applications that operate on data objects associated with identities, the computer network also including a plurality of services that maintain data objects associated with the identity, each service managing at least data objects that follow a corresponding data type schema, the computer-program product for implementing a method for generating a data structure that represents a request to perform an operation on a data object associated with an identity, the data structure following a message schema, the computer program product comprising a computer-readable medium having stored thereon the following:

computer-executable instructions for generating and inserting a first set of one or more data fields into the data structure in accordance with the message schema, the first set of one or more data fields identifying one of a plurality of identities who owns a data object to be accessed by one of a plurality of mobile applications in accordance with an identity-centric, as opposed to an application-centric, data access model;

computer-executable instructions for generating and inserting a second set of one or more data fields into the data structure in accordance with the message schema, the second set of one or more data fields identifying one or more services that manage a plurality of data objects for the plurality of identities including the identity who owns the data object to be accessed, at least some of the data objects being organized in accordance with a data type schema;

computer-executable instructions for generating and inserting a third set of one or more data fields into the data structure in accordance with the message schema, the third set of one or more data fields identifying one of a plurality of data type schemas corresponding to one of the plurality of mobile applications that access the plurality of data objects managed by the one or more services, wherein a particular data object to be accessed is identifiable from at least the identification of the identity who owns the data object to be accessed and the identification of the data type schema;

computer-executable instructions for generating and inserting a fourth set of one or more data fields into the data structure in accordance with the message schema, the fourth set of one or more data fields identifying correlation information for use in correlating the request with a response to the request; and computer-executable instructions for generating and inserting a fifth set of one or more data fields into the data structure in accordance with the message schema, the fifth set of one or more data fields identifying an operation to be performed on the particular data object.

73. A computer program product in accordance with claim 72, wherein the computer-readable medium further has stored thereon the following:
computer-executable instructions for generating and inserting a sixth set of one or more data fields into the data structure in accordance with the message schema, the sixth set of one or more data fields identifying an instance of a data object that follows the data type schema and that is associated with the identity, wherein the particular data object to be accessed is identifiable from at least the identification of the identity, the identification of the data type schema, and the identification of the instance.

74. A computer program product in accordance with claim 72, wherein the computer-readable medium further has stored thereon the following:
computer-executable instructions for generating and inserting a sixth set of one or more data fields into the data structure in accordance with the message schema, the sixth set of one or more data fields identifying a requestor of the operation.

75. A computer program product in accordance with claim 72, wherein the computer-readable medium further has stored thereon the following:
computer-executable instructions for generating and inserting a sixth set of one or more data fields into the data structure in accordance with the message schema, the sixth set of one or more data fields identifying a response address where a response to the request is to be directed.

76. A computer program product in accordance with claim 72, wherein the computer-readable medium further has stored thereon the following:
computer-executable instructions for generating and inserting a sixth set of one or more data fields into the data structure in accordance with the message schema, the sixth set of one or more data fields identifying a protocol used to transport the request.

77. A computer program product in accordance with claim 72, wherein the computer-readable medium is one or more physical storage media.

78. In a computer network that includes a plurality of applications that operate on data objects associated with identities, the computer network also including a plurality of services that maintain data objects associated with the identity, each service managing at least data objects that follow a corresponding data type schema, a method for interpreting a data structure that represents a request to perform an operation on a data object associated with an identity, the data structure following a message schema, the method including the following:
extracting and interpreting a first set of one or more data fields from the data structure in accordance with the message schema, the first set of one or more data fields identifying one of a plurality of identities who owns a data object to be accessed by one of a plurality of mobile applications in accordance with an identity-centric, as opposed to an application-centric, data access model;
extracting and interpreting a second set of one or more data fields from the data structure in accordance with the message schema, the second set of one or more data fields identifying one or more services that manage a plurality of data objects for the plurality of identities including the identity who owns the data object to be accessed, at least some of the data objects being organized in accordance with a data type schema;
extracting and interpreting a third set of one or more data fields from the data structure in accordance with the message schema, the third set of one or more data fields identifying one of a plurality of data type schemas corresponding to one of the plurality of mobile applications that access the plurality of data objects managed by the one or more services;
identifying a particular data object to be accessed based at least on the identification of the identity who owns the data object to be accessed and the identification of the data type schema;
extracting and interpreting a fourth set of one or more data fields from the data structure in accordance with the message schema, the fourth set of one or more data fields identifying correlation information for use in correlating the request with a response to the request;
extracting and interpreting a fifth set of one or more data fields from the data structure in accordance with the message schema, the fifth set of one or more data fields identifying an operation to be performed on the particular data object;
performing the operation on the particular data object; and
returning a response to the request, the response including at least some of the correlation information.

79. A method in accordance with claim 78, further comprising the following:
extracting and interpreting a sixth set of one or more data fields from the data structure in accordance with the message schema, the sixth set of one or more data fields identifying an instance of a data object that follows the data type schema and that is associated with the identity, wherein the particular data object to be accessed is identifiable from at least the identification of the identity, the identification of the data type schema, and the identification of the instance.

80. A method in accordance with claim 78, further comprising the following:
extracting and interpreting a sixth set of one or more data fields from the data structure in accordance with the message schema, the sixth set of one or more data fields identifying a requestor of the operation.

81. A method in accordance with claim 78, further comprising the following:
extracting and interpreting a sixth set of one or more data fields from the data structure in accordance with the message schema, the sixth set of one or more data fields identifying a response address where a response to the request is to be directed.

82. A method in accordance with claim 78, further comprising the following:
extracting and interpreting a sixth set of one or more data fields from the data structure in accordance with the message schema, the sixth set of one or more data fields identifying a protocol used to transport the request.

83. A computer program product for use in a computer network that includes a plurality of applications that operate on data objects associated with identities, the computer network also including a plurality of services that maintain data objects associated with the identity, each service managing at least data objects that follow a corresponding data type schema, the computer program product for implementing a method for interpreting a data structure that represents a request to perform an operation on a data object associated with an identity, the data structure following a message schema, the computer program product comprising a computer-readable medium having stored thereon the following:

computer-executable instructions for extracting and interpreting a first set of one or more data fields from the data structure in accordance with the message schema, the first set of one or more data fields identifying one of a plurality of identities who owns a data object to be accessed by one of a plurality of mobile applications in accordance with an identity-centric, as opposed to an application-centric, data access model;

computer-executable instructions for extracting and interpreting a second set of one or more data fields from the data structure in accordance with the message schema, the second set of one or more data fields identifying one or more services that manage a plurality of data objects for the plurality of identities including the identity who owns the data object to be accessed, at least some of the data objects being organized in accordance with a data type schema;

computer-executable instructions for extracting and interpreting a third set of one or more data fields from the data structure in accordance with the message schema, the third set of one or more data fields identifying one of a plurality of data type schemas corresponding to one of the plurality of mobile applications that access the plurality of data objects managed by the one or more services;

computer-executable instructions for identifying a particular data object to be accessed based at least on the identification of the identity who owns the data object to be accessed and the identification of the data type schema;

computer-executable instructions for extracting and interpreting a fourth set of one or more data fields from the data structure in accordance with the message schema, the fourth set of one or more data fields identifying correlation information for use in correlating the request with a response to the request;

computer-executable instructions for extracting and interpreting a fifth set of one or more data fields from the data structure in accordance with the message schema, the fifth set of one or more data fields identifying an operation to be performed on the particular data object;

computer-executable instructions for causing the operation to be performed on the particular data object; and computer-executable instructions for causing a response to the request to be returned, the response including at least some of the correlation information.

84. A computer program product in accordance with claim 83, wherein the computer-readable medium further has stored thereon the following:

computer-executable instructions for extracting and interpreting a sixth set of one or more data fields from the data structure in accordance with the message schema, the sixth set of one or more data fields identifying an instance of a data object that follows the data type schema and that is associated with the identity, wherein the particular data object to be accessed is identifiable from at least the identification of the identity, the identification of the data type schema, and the identification of the instance.

85. A computer program product in accordance with claim 83, wherein the computer-readable medium further has stored thereon the following:

computer-executable instructions for extracting and interpreting a sixth set of one or more data fields from the data structure in accordance with the message schema, the sixth set of one or more data fields identifying a requestor of the operation.

86. A computer program product in accordance with claim 83, wherein the computer-readable medium further has stored thereon the following:

computer-executable instructions for extracting and interpreting a sixth set of one or more data fields from the data structure in accordance with the message schema, the sixth set of one or more data fields identifying a response address where a response to the request is to be directed.

87. A computer program product in accordance with claim 83, wherein the computer-readable medium further has stored thereon the following:

computer-executable instructions for extracting and interpreting a sixth set of one or more data fields from the data structure in accordance with the message schema, the sixth set of one or more data fields identifying a protocol used to transport the request.

88. A computer program product in accordance with claim 83, wherein the computer-readable medium is one or more physical storage media.

* * * * *

UNITED STATES PATENT AND TRADEMARK OFFICE
CERTIFICATE OF CORRECTION

PATENT NO. : 6,985,958 B2
APPLICATION NO. : 10/003754
DATED : January 10, 2006
INVENTOR(S) : Mark Lucovsky et al.

It is certified that error appears in the above-identified patent and that said Letters Patent is hereby corrected as shown below:

In column 6, line 44, after "601" insert -- , --.

In column 6, line 60, delete "extensible" and insert -- eXtensible --, therefor.

In column 8, line 42, delete "box" and insert -- box. --, therefor.

In column 12, line(s) 6–7, delete "Lines 12" and insert -- Line 12 --, therefor.

In column 12, line 63, delete "requester" and insert -- requestor --, therefor.

In column 12, line 64, delete "requester" and insert -- requestor --, therefor.

In column 13, line 20, delete "dentity-centric" and insert -- identity-centric --, therefor.

In column 19, line 62, in Claim 48, delete "idenitify" and insert -- identify --, therefor.

In column 22, line 6, in Claim 69, delete "request" and insert -- requestor --, therefor.

Signed and Sealed this

Twenty-ninth Day of September, 2009

David J. Kappos
*Director of the United States Patent and Trademark Office*